United States Patent [19]

Germain et al.

[11] Patent Number: 5,767,053
[45] Date of Patent: Jun. 16, 1998

[54] PARTICULATE FOAM CONTROL AGENTS AND THEIR USE

[75] Inventors: Pierre Andre Georges Gustave Germain, Marcinelle, Belgium; Bernhard Ernst Gold, Moenchengladbach, Germany; Jan Sybren Hoogland, Brussels; Bertrand Louis Julien Lenoble, Hellebecq, both of Belgium; Mark Prince, Huldenberg, Belgium

[73] Assignee: Dow Corning S. A., Seneffe, Belgium

[21] Appl. No.: 575,424

[22] Filed: Dec. 20, 1995

[30] Foreign Application Priority Data

Dec. 24, 1994 [GB] United Kingdom ............... 9426236

[51] Int. Cl.$^6$ .............. B01D 19/04; C11D 3/08; C11D 3/37
[52] U.S. Cl. .............. 510/349; 252/321; 252/358; 510/441; 510/466
[58] Field of Search .............. 252/321, 358; 510/349, 276, 441, 466

[56] References Cited

U.S. PATENT DOCUMENTS

| 4,419,260 | 12/1983 | Reuter et al. | 510/276 |
| 4,713,193 | 12/1987 | Tai | 510/349 |
| 4,732,694 | 3/1988 | Gowland et al. | 510/276 |
| 5,318,718 | 6/1994 | Seiter et al. | 252/358 |
| 5,456,855 | 10/1995 | De Cupere | 510/349 |
| 5,589,449 | 12/1996 | Kolaitis et al. | 252/358 |

FOREIGN PATENT DOCUMENTS

| 0013028 | 12/1979 | European Pat. Off. | C11D 3/08 |
| 0031532 | 12/1980 | European Pat. Off. | B01D 19/04 |
| 0142910 | 8/1984 | European Pat. Off. | C11D 3/00 |
| 0192442 | 2/1986 | European Pat. Off. | C11D 3/20 |
| 0206522 | 5/1986 | European Pat. Off. | C11D 3/00 |
| 0210721 | 5/1986 | European Pat. Off. | C11D 3/37 |
| 0217501 | 7/1986 | European Pat. Off. | B01D 3/00 |
| 0273448 | 12/1987 | European Pat. Off. | C08F 299/08 |
| 0329842 | 12/1988 | European Pat. Off. | C11D 3/12 |
| 0484081 | 10/1991 | European Pat. Off. | C11D 3/37 |
| 0578424 | 6/1993 | European Pat. Off. | C11D 3/37 |
| 3805661 | 9/1989 | Germany | C08G 77/38 |
| 639673 | 8/1946 | United Kingdom. | |
| 1407997 | 8/1973 | United Kingdom | C11D 10/00 |
| 1523957 | 5/1977 | United Kingdom | C11D 17/00 |
| 2009223 | 12/1978 | United Kingdom | C11D 3/37 |
| 2257709 | 7/1992 | United Kingdom | C08L 83/04 |

OTHER PUBLICATIONS

Hawley's Condensed Chemical Dictionary, Eleventh Edition, Van Nostrand Reinhold Co., Inc., NY, NY, Copyright 1987, p. 790.

*Primary Examiner*—Richard D. Lovering
*Assistant Examiner*—Daniel S. Metzmaier
*Attorney, Agent, or Firm*—Timothy J. Troy

[57] ABSTRACT

A method of making a particulate foam control agent comprising 0.001 to 30 parts of silicone antifoam, 45 to 99 parts of a zeolite and 0 to 30 parts of a binder, preferably of a polycarboxylate-type, able to release at least some antifoam from the zeolite in the first 10 minutes of a washing cycle comprises depositing from 0.1 to 500% of the silicone antifoam of an organic surfactant onto the zeolite not later than depositing the silicone antifoam, at least 1 part of surfactant being used per 100 parts of the foam control agent. Also covered are detergent compositions and some foam control agents.

18 Claims, No Drawings

PARTICULATE FOAM CONTROL AGENTS AND THEIR USE

This invention relates to silicone based foam control agents which are particulate, and especially those which are intended for incorporation in detergent compositions which are in powder form. The invention also relates to the use of the foam control agents, and to a method of improving the release of foam control agents during the wash cycle.

Foam control agents based on silicone antifoams, and foam control agents which are in particulate form, are well known in the art. Many patent specification describe such foam control agents. Silicone base foam control agents for powder detergent compositions are also well known. Many patent specifications describe the problems of diminishing foam control ability of the silicone based foam control agents when stored in powder detergents for prolonged periods of time. Solutions to overcome the storage problem have been suggested, and include the use of a variety of materials as encapsulating or protective materials, intended to coat or bind the silicone antifoam. The theory is that encapsulation or binding counteracts the unwanted spreading of the silicone oil of the antifoam onto the surrounding detergent powder, which spreading would result in the reduction of the concentration of one of the most important ingredients of the foam control agents, and in extreme cases the depletion from the foam control agent of the silicone oil altogether, thus deactivating the foam control agent. In combination with the use of such encapsulating or protective materials a carrier material is often used. Carrier materials are often used in combination with the foam control agents to make these foam control agents into a more substantial and more easily handled solid particulate material, which can be post-blended as a powder with the rest of the powder detergent composition.

Materials which are suggested as carrier materials for particulate silicone based foam control agents include water soluble, water insoluble and water dispersible materials. Examples of suggested carrier materials are sulphates, carbonates, phosphates, polyphosphates, silicas, silicates, clays, starches, cellulosic materials and aluminosilicates. The use of carrier materials adds a component to the final composition of the detergent powder. If the carrier material is not itself a component which contributes to the efficiency or activity of the powder detergent, it will in effect constitute an additional soil which has to be removed during the laundering process. As a result it is desirable to use materials which are standard components in detergent powders.

A particularly preferred carrier material for particulate foam control agents is sodium tripolyphosphate. However, in view of the desire to reduce and even eliminate phosphates in detergent compositions for environmental reasons, there has been a need to find more suitable carrier materials. Many materials do not have the correct caking ability, density, particle strength or size. This explains why many proposals have used non-active materials in powder detergents, e.g. starch. There is therefore a need to provide other suitable materials as carriers for foam control agents. One particularly useful active material for the detergent composition is zeolite.

Zeolites have been mentioned as an optional carrier material for silicone foam control agents in a number of patent specification. For example in G.B. 2 009 223 there is disclosed a process for the preparation of a pulverulent detergent which comprises a pulverulent or granular premix prepared by granulating 50 to 99% of one or more structural substances and/or magnesium silicate with 1 to 15% by weight based on the premix of organic silicon polymers, which are preferably polydimethylsiloxanes which may be combined with a pyrogenic silica (i.e. the antifoam). The structural substances are selected from phosphate, polyphosphate, silicate, aluminosilicate, carbonate, sulphate, polycarboxylate or phosphate in the form of its alkali metal salt. Aluminosilicates which are hydrated and are capable of cation exchange are mentioned, but do not constitute preferred materials. No examples using an aluminosilicate carrier are given. Additional components of the premix may include emulsifiers, waxy compounds and water soluble polymers.

Suggestions that carriers can be selected from a large group of materials, including organic and inorganic materials, which group includes as one option aluminosilicates or zeolites, have also been made in a number of other patent specifications, for example E.P. 13 028, E.P. 142 910, E.P. 206 522 and E.P. 484 081. However, in none of these patent specifications are zeolites used as the actual carrier material for foam control agents.

While investigating the feasibility of the use of zeolites as carrier materials for foam control agents, the Applicants observed that there is a problem connected to their use as carrier materials. This problem lies in the fact that, even though the foam control agents can be formed into a good particulate material by using zeolite carriers, there is very little, if any, actual control of the foam level in the washing machine, especially in the early part of the washing cycle if traditionally standard amounts of silicone antifoams are employed. This may well be due to the fact that zeolites, being natural absorbant materials, do not release the silicone antifoam sufficiently easily. This explains why, up to now, nobody has used zeolites as carrier materials for silicone-based foam control agents in commercial powder detergents and why no examples have been included in the above mentioned patent specifications. One possible way to attempt to overcome this problem could involve the use of greatly increased amounts of foam control agent incorporated in a powder detergent composition, resulting in the availability of an excess of foam control agent, even at the early stages of the washing cycle. This solution is, however, economically not attractive and often has side effects on the detersive activity of the powder, e.g. resulting in spotting of the laundered fabrics.

In E.P. 329 842 zeolites have been suggested and exemplified as carriers for foam control agents. The specification discloses a powder detergent composition comprising a silica containing silicone foam control agent. The foam control agent consists for 85 to 96% of a zeolite as carrier, 3 to 9% of a low viscosity silicone oil, 1 to 5% of a high viscosity silicone oil and 0.5 to 1.5% of a hydro-phobic silica. The examples show a good performance and a good storage stability for a number of these compositions. No details are given of the surfactants used to form the detergent composition. Neither are there any details given on the exact amount of silicone antifoam (i.e. combination of silicone oil and silica) which is used in the foam control agent. If one assumes for the latter the average values of those indicated in the description, this would result in 10% by weight of the foam control agent being taken up by the silicone antifoam. The silicone oil which is used in the silicone antifoam is a mixture of a low viscosity silicone oil and a high viscosity silicone oil. The silicone oil is a linear polydimethylsiloxane and the low viscosity is given as being in the range from 100 to 5,000 $mm^2/s$, while the high viscosity is given as from 30,000 to 100,000 $mm^2/s$. The examples indicate that 3.75 g of the foam control agent is added to 100 g of powder detergent which includes 13 g of surfactants. This is a higher than average relative level of silicone antifoam (i.e. 0.375% by weight of the detergent composition), confirming the drawbacks described above.

There is a need to find a method of improving the foam control agents to enable the use of lower concentrations of the antifoam relative to the surfactant concentration in the powder, while achieving a good release of the foam control agent in the early stages of the washing cycle.

There is also a need to find a way of enabling detergent manufacturers to use zeolites as carriers for silicone foam control agents with improving the release of the antifoam into the washing liquor, especially in the early stages of the washing cycle, without having to incorporate very high levels of foam control agents.

In our co-pending application EP 94305311.6 we have disclosed that if the silicone antifoam is absorbed on a zeolite carrier in combination with a polyorganosiloxane polyoxyalkylene copolymer, an improved release of the silicone antifoam is obtained in the early part of the washing cycle. There is particularly disclosed a method of providing a foam control agent which comprises from 1 to 30 parts by weight of a silicone antifoam and from 70 to 99 parts by weight of a zeolite carrier for the antifoam, with the ability to release at least part of the antifoam from the carrier within 10 minutes of being dispersed in an aqueous surfactant solution, which comprises depositing from 5 to 60% by weight of the silicone antifoam of an organopoly-siloxane polyoxyalkylene copolymer onto the zeolite carrier not later than depositing the silicone antifoam thereon.

We have now found that non-silicone containing organic surfactants can also provide a solution for the problem stated above. This is surprising as it was believed that a strong compatibility between the surfactants and the antifoams was required for the invention to work. It is therefore unexpected that less compatible organic surfactants are useful to perform the task of encouraging release of the silicone antifoam from the zeolite carrier. Accordingly the invention provides in a first aspect a method of providing a particulate foam control agent which comprises from 0.001 to 30 parts by weight of a silicone antifoam, from 45 to 99 parts by weight of a zeo-lite carrier for the antifoam and optionally 0 to 30 parts by weight of a binder, with the ability to release at least part of the antifoam from the carrier within 10 minutes of being dispersed in an aqueous surfactant solution, which comprises depositing from 0.1 to 500% by weight of the silicone antifoam of an organic surfactant onto the zeolite carrier not later than depositing the silicone antifoam onto the zeolite provided at least 1 part by weight of surfactant is used per 100 parts by weight of the foam control agent.

There is also provided in a second aspect of the invention the use of 0.1 to 500% by weight based on the weight of a silicone antifoam of an organic surfactant as a release agent for the silicone antifoam from a foam control agent which comprises from 0.001 to 30 parts by weight of a silicone antifoam, from 45 to 99 parts by weight of a zeolite carrier for the antifoam and from 0 to 30 parts by weight of a binder, when said foam control agent is dispersed in an aqueous surfactant solution.

Silicone antifoams as used herein are known materials and many have been described in patent specifications, including those referred to herein. Silicone antifoams are foam regulating compositions which comprise a liquid organopolysiloxane polymer and a filler particle the surface of which has been rendered hydrophobic.

Liquid organopolysiloxane polymers which are useful in silicone antifoams are also known and have been described in many patent specifications. Full description of all options is therefore not included but can be found in the many publications, including European application EP0578424. Preferably they are linear or branched polymers having a structure according to the general formula

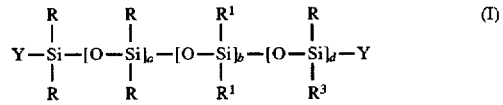

In formula (I) R denotes a monovalent hydrocarbon group having from 1 to 8 carbon atoms, preferably 1 to 4 carbon atoms, $R^1$ denotes a group R, a hydroxyl group or a group

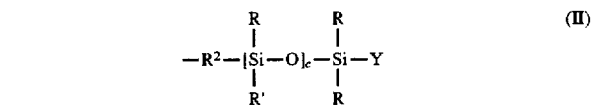

wherein $R^2$ denotes a divalent hydrocarbon, hydrocarbonoxy or siloxane group or oxygen and Y denotes a group R or a hydroxyl group, $R^3$ denotes a $C_{9-35}$ alkyl group, a, b, c and d have a value of 0 or an integer, provided at least one of a and b is an integer and the total of a+b+c+d has a value such that the viscosity of the organopolysiloxane polymer at 25° C. is at least 50 $mm^2/s$, preferably at least 500 $mm^2/s$. The organopolysiloxane polymers may be linear, in which case $R^1$ denotes R or a hydroxyl group. It is preferred for the linear organopolysiloxanes that Y denotes a group R and that b=0. More preferred are those linear polymers wherein d=0 and wherein at least 80% of all R groups denote an alkyl group having from 1 to 4 carbon atoms, most preferably methyl. It is most preferred that the linear organopolysiloxanes are trimethylsiloxane end-blocked polydimethylsiloxanes. The preferred viscosity of the linear organopolysiloxanes is from 500 to 100,000 $mm^2/s$, more preferably 1000 to 60,000 $mm^2/s$ at 25° C.

Organopolysiloxanes which are not linear are also known in the art. The preferred non-linear materials are those having branching in the siloxane chain. These polymers have a structure according to Formula (I), wherein b has a value of at least 1 and $R^2$ is preferably a divalent siloxane group or an oxygen atom. Particularly preferred siloxane groups $R^2$ are small three-dimensional siloxane resin particles which may have a number of pending siloxane polymer units. Branched siloxanes are known and examples of them have been described together with a method of making them in a number of patent specifications, e.g. G.B. 639 673, E.P. 31 532, E.P. 217 501, E.P. 273 448, DE 38 05 661 and G.B. 2 257 709.

Preferred liquid organopolysiloxanes are branched or higher viscosity siloxanes (i.e. above 12,500 $mm^2/s$ at 25° C.) especially the branched siloxanes, as they show an improved ability to control foam in aqueous surfactant solutions.

Filler particles which are useful in the antifoams for the present invention are also well known and have been described in many publications. They are finely divided particulate materials including silica, fumed $TiO_2$, $Al_2O_3$, zinc oxide, magnesium oxide, salts of aliphatic carboxylic acids, reaction products of isocyanates with certain materials, e.g. cyclohexylamine, alkyl amides, for example ethylene or methylene bis stearamide. Most preferred are silica particles with a surface area as measured by BET measurement of at least 50 $m^2/g$. Suitable silica particles may be made according to any of the standard manufacturing techniques for example thermal decomposition of a silicon halide, decomposition and precipitation of a metal salt of silicic acid, e.g. sodium silicate and a gel formation method. Suitable silicas for use in the antifoams include therefore fumed silica, precipitated silica and gel formation silica. The average particle size of these fillers may range from 0.1 to 20 μm, but preferably is from 0.5 to 2.5 μm.

Where the filler particles are not hydrophobic by themselves their surface is rendered hydrophobic in order to make the antifoam sufficiently effective in aqueous systems. Rendering the filler particles hydrophobic may be done prior to or after dispersing the filler particles in the liquid organopolysiloxane. This can be effected by treatment of the filler particles with treating agents, e.g. reactive silanes or siloxanes, for example dimethyldichlorosilane, trimethylchlorosilane, hexamethyldisilazane, hydroxyl end-blocked and methyl end-blocked polydimethylsiloxanes, siloxane resins, fatty acids or a mixture of one or more of these. Fillers which have already been treated with such compounds are commercially available from many companies, e.g. Sipernat® D10 from Degussa. The surface of the filler may alternatively be rendered hydrophobic in situ, i.e. after the filler has been dispersed in the liquid organopolysiloxane component. This may be effected by adding to the liquid organopolysiloxane prior to, during or after the dispersion of the filler therein, the appropriate amount of treating agent of the kind described above and heating the mixture to a temperature above 40° C. The quantity of treating agent to be employed will depend for example on the nature of the agent and the filler and will be evident or ascertainable by those skilled in the art. Sufficient should be employed to endow the filler with at least a discernible degree of hydrophobicity. The filler particles are added to the organopolysiloxane in an amount of from 1 to 25% by weight of the antifoam, preferably from 1 to 20%, most preferably from 2 to 8%.

The zeolite which may be used in the process according to the invention may be any of those aluminosilicate materials which are known to be beneficial in detergent powder compositions and have been described in a number of patent specifications. Zeolites are used as cation exchange components. Suitable zeolite materials include particularly those which are known as Zeolite A and have an average formula $(Na_2O)_m \cdot Al_2O_3 \cdot (SiO_2)_n \cdot (H_2O)_t$ wherein m has a value of from 0.9 to 1.3, n a value of from 1.3 to 4.0 and t a value of from 1 to 6. Such zeolites are known ingredients in detergent powder compositions. Suitable zeolites may be crystalline or amorphous aluminosilicates and have been described in particular in E.P. 192 442 and E.P. 329 842 and in the patent specifications which are referred to on page 2 of the latter specification. In addition to the zeolite carrier material, other carrier materials may also be used, which may be organic or inorganic, preferably components of detergent compositions.

The organic surfactant which may be used in the invention may be any surface active material which does not contain any silicon atoms. Preferably the surfactant is a detergent-active material, as this will have the added advantage of being an active ingredient in an aqueous surfactant solution into which the foam control agent will be used, e.g. a powder detergent composition. It is preferred that the organic surfactant is a soluble or dispersible in an aqueous surfactant solution. More preferably they are water soluble or water dispersible surfactants. Suitable surfactants have been described in a number of publications and are generally well known in the art. It is preferred that the organic surfactant is able to emulsify a siloxane material at least to some extent in an aqueous system, more preferably the organic surfactant is a good emulsifier of a siloxane material, especially of siloxane materials which are used for making the silicone antifoam.

Suitable organic surfactants for use in the present invention may be anionic, cationic, nonionic or amphoteric materials. Mixtures of one or more of these may also be used. Suitable anionic organic surfactants include alkali metal soaps of higher fatty acids, alkyl aryl sulphonates, for example sodium dodecyl benzene sulphonate, long chain (fatty) alcohol sulphates, olefin sulphates and sulpho-nates, sulphated monoglycerides, sulphated esters, sulphosuccinates, alkane sulphonates, phosphate esters, alkyl isothionates, sucrose esters and fluoro-surfactants. Suitable cationic organic surfactants include alkylamine salts, quaternary ammonium salts, sulphonium salts and phosphonium salts. Suitable nonionic surfactants include condensates of ethylene oxide with a long chain (fatty) alcohol or (fatty) acid, for example $C_{14-15}$ alcohol, condensed with 7 moles of ethylene oxide (Dobanol® 45–7), condensates of ethylene oxide with an amine or an amide, condensation products of ethylene and propylene oxides, fatty acid alkylol amide and fatty amine oxides. Suitable amphoteric organic detergent surfactants include imidazoline compounds, alkylaminoacid salts and betaines. It is more preferred that the organic surfactants are nonionic or anionic materials, preferably with a HLB value of at least 7. Of particular interest are surfactants which are environmentally acceptable.

More preferred organic surfactants are alkyl sulphates, alkyl sulphonates, primary alkyl ethoxylates and alkylpolyglucosides or derivatives thereof. Many of these surfactants are commercially available. Specific examples of them are illustrated in the examples of the present specification. It is particularly useful to employ organic surfactants which have a melting point which is in the range of or higher than room temperature (i.e. 18° C.), as these surfactants will additionally improve the stability of the foam control agent during storage. If organic surfactants with a sufficiently high melting point are used, e.g. higher than 40° C., or a higher amount of organic surfactant is used, e.g. from 100 to 500% by weight based on the amount of antifoam present, preferably 200 to 500%, the optional binder may not be required to give good storage stability, as further explained below.

Many patent specifications describe the problems of diminishing foam control ability of the silicone based foam control agents when stored in powder detergents for prolonged periods of time. Solutions to overcome the storage problem have been suggested and include the use of a variety of materials as encapsulating or protective materials, intended to coat or bind the silicone antifoam. The theory is that encapsulation, or binding, counteracts the unwanted spreading of the silicone oil of the antifoam onto the surrounding detergent powder which spreading results in the reduction of the concentration of one of the most important ingredients of the foam control agents and, in extreme cases, depleting the foam control agent of the silicone oil altogether, thus deactivating the foam control agent. Encapsulating or protective materials are often used in combination with the carrier material.

It is therefore preferred that the foam control agent also does comprise a binder material, sometimes referred to as an encapsulant material, in order to improve the storage stability of the foam control agent in a powder detergent composition. The binder or encapsulant material may be any of the known or proposed binder of encapsulant materials described in the art of protecting foam control agents in powder detergent compositions against deterioration upon storage. Suitable materials have been described in a number of patent specifications. G.B. 1 407 997 discloses the use of an organic material which is water soluble or water dispersible, substantially non-surface active and detergent impermeable. Examples given in that specification include gelatin, agar and reaction products or tallow alcohol and ethylene oxide. In that patent specification the antifoam is protected in storage by causing the organic material to contain the antifoam in its interior, thus effectively isolating it from the detergent component of the composition. In G.B. 1 523 957 there is disclosed the use of a water insoluble wax having a melting point in the range from 55 to 100° C. and a water insoluble emulsifying agent.

In E.P. 13 028 there is suggested that in combination with a carrier and a cellulosic ether, there is used a nonionic surfactant, which is exemplified by ethoxylated aliphatic $C_{12-20}$ alcohols with 4 to 20 oxyethylene groups, ethoxylated alkylphenols, fatty acids, amides of fatty acids, thio alcohols and diols, all having 4 to 20 carbon atoms in the hydrophobic part and 5 to 15 oxyethylene groups. In E.P. 142 910, there is disclosed the use of a water soluble or water dispersible organic carrier comprising from 1 to 100% of a first organic carrier component having a melting point of from 38° to 90° C. and from 0 to 99% of a second organic carrier which is selected from ethoxylated non-ionic surfactants having a HLB of from 9.5 to 13.5 and a melting point from 5° to 36° C. Examples of the organic carrier materials include tallow alcohol ethoxylates, fatty acid esters and amides and polyvinylpyrrolidone. In E.P. 206 522 there is described the use of a material which is impervious to oily antifoam active substance when in the dry state, yet capable of disruption on contact with water. Examples given include materials with a waxy nature which may form an interrupted coating that will allow water to pass through under was conditions. Other materials which are listed include water soluble sugars. In E.P. 210 721 there is disclosed the use of an organic material which is a fatty acid or a fatty alcohol having a carbon chain of from 12 to 20 carbon atoms and a melting point of from 45° to 80° C., for example stearic acid or stearyl alcohol.

It will be clear to the person skilled in the art that the binder material, where an organic surfactant is employed, may be the same as the organic surfactant component of the foam control agent itself.

A particularly preferred binder is a polycarboxylate-type binder or encapsulant. An improved silicone foam control agent may be obtained with such binder, which has better powder characteristics, has a better release of antifoam in the early part of the washing cycle and a good storage stability.

Such silicone foam control agents are novel and form a third aspect of the present invention. According to that aspect there is provided a particulate foam control agent comprising from 0.001 to 30 parts by weight of a silicone antifoam, from 45 to 99 parts by weight of a zeolite carrier for the antifoam, from 0.1 to 500% by weight of the silicone antifoam of an organic surfactant, which has been deposited onto the zeolite carrier not later than the silicone antifoam and from 1 to 30 parts by weight of a binder of encapsulant with is a polycarboxylate-type material.

So-called polycarboxylate materials have been described in the art, and have the advantage that, as zeolites, they are useful ingredients in detergent compositions. Some of them have been suggested as polymeric coatings for antifoam ingredients in E.P. 484 081, in conjunction with a silicone oil antifoam and a solid carrier which, though suggested as possibly being a zeolite, is preferably a carbonate. No examples of the combination with zeolites is given, reinforcing the arguments given above, relating to the release problems experienced with the use of zeolites as carriers without the use of this invention.

Polycarboxylate materials are known as dispersing agents in detergent powders and are water soluble polymers,
copolymers or salts thereof. They have at least 60% by weight of segments with the general formula

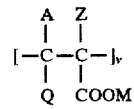

wherein A, Q and Z are each selected from the group consisting of hydrogen, methyl, carboxy, carboxymethyl, hydroxy and hydroxymethyl, M is hydrogen, alkali metal, ammonium or substituted ammonium and v is from 30 to 400. Preferably A is hydrogen or hydroxy, Q is hydrogen or carboxy and Z is hydrogen. Suitable polymeric polycarboxylates include polymerised products of unsaturated monomeric acids, e.g. acrylic acid, maleic acid, maleic anhydride, fumaric acid, itaconic acid, aconitic acid, mesaconic acid, citraconic acid and methylenemalonic acid. The copolymerisation with lesser amounts of monomeric materials comprising no carboxylic acid, e.g. vinylmethyl, vinylmethylethers, styrene and ethylene is not detrimental to the use of the polycarboxylates in the foam control agents of the present invention. Depending on the type of polycarboxylate this level can be kept low, or levels can be up to about 40% by weight of the total polymer or copolymer.

Particularly suitable polymeric polycarboxylates are polyacrylates with an average viscosity at 25° C. in mPa.s from 50 to 10,000, preferably 2,000 to 8,000. The most preferred polycarboxylate polymers are acrylate/maleate or acrylate/fumarate copolymers or their sodium salts. Molar mass of suitable polycarboxylates may be in the range from 1,000 to 500,000, preferably 3,000 to 100,000, most preferably 15,000 to 80,000. The ratio of acrylate to maleate or fumarate segments of from 30:1 to 2:1. Polycarboxylates may be supplied in powder form or liquid forms. They may be liquid at room temperature or may be supplied as aqueous solutions. The latter are preferred as they facilitate the manufacture of the foam control agents according to the invention with conventional spray applications.

Many of the polycarboxylates are hygroscopic but are claimed not to absorb water from air when formulated in detergent powders.

It was surprisingly found that the use of polycarboxylates as binders and/or encapsulants for antifoam in the foam control agents of the present invention enabled a more efficient absorption of antifoam onto the carrier, resulting in a more efficient foam control agent. It was also found that the combination of all the ingredients allowed the manufacture of a particulate foam control agent with improved powder characteristics. For example, foam control agents using a polycarboxylate binder provide better mechanical strength and flowability of the foam control agent and are also more environmentally friendly because of avoiding the need to include other materials into powder detergents which have no direct benefit to the efficiency of the detergent composition. Foam control agents according to the present invention are particularly useful for compact washing powders.

It is however also feasible to add to foam control agents as described in the different aspects of the invention, additional ingredients which may include polymers or other ingredients, e.g., sodium silicates to increase the mechanical strength of the particles. These additional ingredients may be added during any stage of the preparation, preferable however, they are incorporated in the latter stages of preparation, e.g., by post-addition.

In the method of the invention it is important that the silicone antifoam is not deposited onto the zeolite surface prior to the deposition of the organic surfactant. If this condition is not fulfilled the antifoam release in the initial part of a washing cycle will not be as good. The preferred method is where a mixture of the surfactant and the silicone antifoam is deposited onto the zeolite surface. Where a binder or encapsulant is also present in the foam control agent, it is preferred to make a premix of the three components (silicone antifoam, organic surfactant and binder or encapsulant), which may be done by any of the known methods, and to deposit the premix onto the zeolite surface. The premix can be made by simply mixing the ingredients, preferably with reasonable shear or high shear. Where one or more ingredients are solid or waxy materials, or materials of high viscosity, it may be beneficial to heat the mixture to melt or reduce the working viscosity of the mixture. Alternatively the premix of the components may be diluted with a solvent, e.g. a low viscosity siloxane polymer, cyclic siloxane polymer, organic solvent or even by making a dispersion in water.

Depositing the mix onto zeolites can be done in a number of ways. Conventional procedures of making powders are particularly useful for making the particulate foam control agent. These include depositing of a previously prepared mixture of all of the two or three components onto the zeolite, which is the most preferred method. It is also possible to deposit each of the ingredients separately onto the zeolite, in which case it is important that the silicone antifoam is not deposited prior to the organic surfactant. This is also important if a mixture of only two ingredients out of three is deposited separately from the third ingredient. For example the organic surfactant may be deposited first, followed by deposition of a mixture of the silicone antifoam and the binder. Alternatively, the silicone antifoam may be mixed with the organic surfactant and deposited onto the foam control agent prior to depositing the binder. It is less beneficial to make a mixture of the organic surfactant with the binder or encapsulant and to deposit this prior to the deposition of the silicone antifoam. One particularly useful way of depositing the components onto the zeolite is by spraying one or more of these onto the zeolite, which may be present in a drum mixer, fluidised bed etc. This may be done at room temperature or at elevated temperature, which is particularly useful if one wants to evaporate some or all of the solvent during the process. In one process the zeolite powder is mixed with the premix of all the other components, e.g. in a high shear mixer, e.g. Eirich® pan granulator, Schugi® mixer, Paxeson-Kelly® twin-core blender, Loedige® ploughshare mixer, Aeromatic® fluidised bed granulator or Pharma® type drum mixer. The deposition may be done by pouring the mixture into the mixer as well as by spraying, as is described above.

A particularly useful method includes the use of small amounts of water. It is preferred to keep the amount of water used small, i.e. not exceeding 50% by weight of the amount of zeolite used in the method. The water can be introduced as an additional ingredient or by providing the surfactant as a solution or dispersion.

The method of the invention uses from 0.001 to 30 parts by weight of silicone antifoam and from 45 to 99 parts by weight of zeolite. If a lower amount of silicone antifoam were to be used this would make the foam control agent less effective, as the silicone antifoam would be too thinly distributed on the carrier material. Higher amounts than 30 parts of silicone antifoam are possible in theory but are not practical, as this would render the dispersion of the foam control agent in the powder detergent more difficult and one could not be sure that each measure of powder detergent would incorporate the correct amount of silicone antifoam. Higher levels would also possibly result in a more tacky material, which would not be granulated very easily. Preferably 1 to 20 parts of silicone antifoam are used, more preferably 5 to 15 parts by weight.

The zeolites are used in an amount of from 45 to 99 parts by weight of the foam control composition for every 0.001 to 30 parts of the silicone antifoam. Preferably they comprise about 45 to 99% by weight of the total weight of the components mentioned as forming part of the foam control agent, i.e. the silicone antifoam, the zeolite, the binder and the organic surfactant, more preferably 60 to 85%.

Thus use of 0.1 to 500% of organic surfactant by weight based on the weight of the silicone antifoam is chosen for efficiency reasons as well as to minimise the amount of material which is to be introduced in the powder detergent which is not necessarily beneficial to the cleaning efficiency of the detergent composition. It is more preferred to use 2 to 200% of the organic surfactant by weight based on the weight of the silicone antifoam, particularly if no binder or encapsulant is used in the foam control agent. Most preferably the amount of organic surfactant used is from 20 to 150% of the silicone antifoam. It was found that the presence of organic surfactants also may improve the foam control efficiency, especially where the silicone antifoam has a relatively high viscosity or where a wash cycle is performed at lower temperatures, e.g. 40° C. or below.

In E.P. 142 910, there is described a suds-suppressor composition which comprises (a) an antifoam which comprises a blend of (i) a high shear mix of a polydimethylsiloxane and a hydrophobic silica, the siloxane having a viscosity of from 20 to 12,500 mm$^2$/s and (ii) a polydimethylsiloxane having a viscosity of at least 25,000 mm$^2$/s, provided the blend has a viscosity of at least 18,000 mm$^2$/s, the antifoam being dispersed in (b) a certain water-soluble or water-dispersible organic carrier having a melting point from 38 to 90° C. Where the suds-suppressor composition is to be a granular suppressor, from 25 to 95% by weight of the compo-sition should be a water-soluble or water-dispersible inorganic diluent would be included. The preferred diluent is sodium tripolyphosphate, but water-dispersible materials, stated as including among many others aluminosilicates, could also be used.

The prior art as disclosed in E.P. 142 910 and E.P. 329 842 only discuss antifoams which are linear and which include a polydimethylsiloxane which has a viscosity which is below 12,500 mm$^2$/s at 25° C. Both specifications also address the question of storage stability of the foam control agents when kept in a detergent composition for a prolonged time. There is no indication as to how one might solve the problem which is addressed by the inventors of the present application.

In addition the applicant has found that the above mentioned release problem in the early stages of a washing cycle of antifoam compound from foam control agents which used zeolites as the carrier material, is worse for antifoam compounds based on organosilicon compounds with as the only silicone oil compound a higher viscosity organosilicon compound (i.e. above 12,500 mm$^2$/s at 25° C.) and for antifoam compounds using branched organosilicon compounds. Foam control agents which use zeolite carrier materials and higher viscosity or branched organosilicon compounds in conjunction with organic surfactants are novel in themselves. They also are developed to solve a very different problem from those of the prior art.

The invention provides in a fourth aspect a foam control agent comprising (A) from 0.001 to 30 parts by weight of a silicone antifoam which consists of (i) from 70 to 99% by weight of a polyorganosiloxane polymer, selected from (a) linear polydiorganosiloxane polymers having a viscosity of more than 12,500 mm$^2$/s at 25° C. and (b) branched polyorganosiloxanes and (ii) from 1 to 30% by weight of a filler material which has its surface made hydrophobic, (B) from 45 to 99 parts by weight of a zeolite and (C) an organic surfactant in an amount which is from 1 to 500% by weight of antifoam (A).

Details of each of the components are given above where the first aspect of the invention is discussed. These details and preferred ranges, materials and ratios also apply to the second aspect of the invention. With regard to the polyorganosiloxane polymer used in the silicone antifoam, the linear polydiorganosiloxane is most preferably a polydimethylsiloxane polymer, which is most preferably end-blocked with trimethylsiloxane units. The viscosity of the preferred polyorganosiloxane is from 12,500 to 40,000 mm$^2$/s, most preferably 12,500 to 25,000 mm$^2$/s at 25° C. The branched polyorganosiloxane is preferably as disclosed above.

It is preferred that the foam control agents do include a binder or encapsulant, as described above.

A binder or encapsulating material may be included in the foam control agent at a level of up to 30 parts by weight. It is however preferred that where a binder is used, from 1 to 25 parts by weight are used in addition to the components present in amounts as defined above. More preferably the amount of binder or encapsulating material is used in amounts of from 5 to 20 parts, most preferably about 10 parts by weight.

There is also provided in the present invention a detergent composition in powder form which comprises 100 parts by weight of a detergent component and sufficient of a foam control agent according to the third or fourth aspect of the invention to give 0.05 to 5 parts by weight of the silicone antifoam comprised in the foam control agent.

Suitable detergent components are well known in the art and have been described in numerous publications. The components comprise an active detergent, organic and/or inorganic builder salts and other additives and diluents. The active detergent may comprise organic detergent surfactants of the anionic, cationic, non-ionic or amphoteric type, or mixtures thereof. Suitable anionic organic detergent surfactants include alkali metal soaps of higher fatty acids, alkyl aryl sulphonates, for example sodium dodecyl benzene sulphonate, long chain (fatty) alcohol sulphates, olefine sulphates and sulphonates, sulphated monoglycerides, sulphated esters, sulphosuccinates, alkane sulphonates, phosphate esters, alkyl isothionates, sucrose esters and fluorosurfactants. Suitable cationic organic detergent surfactants include alkylamine salts, quaternary ammonium salts, sulphonium salts and phosphonium salts. Suitable non-ionic detergent surfactants include conden-sates of ethylene oxide with a long chain (fatty) alcohol or (fatty) acid, for example C14-15 alcohol, condensed with 7 moles of ethylene oxide (Dobanol® 45-7), condensates of ethylene oxide with an amine or an amide, condensation products of ethylene and propylene oxides, fatty acid alkylol amide and fatty amine oxides. Suitable amphoteric organic detergent surfactants include imidazoline compounds, alkylaminoacid salts and betaines. Examples of inorganic components are phosphates, polyphosphates, silicates, carbonates, sulphates, oxygen releasing compounds such as sodium perborate and other bleaching agents and alumino-silicates, e.g. zeolites. Examples of organic components are anti-redeposition agents such as carboxymethylcellulose (CMC), brighteners, chelating agents such as ethylene diamine tetra-acetic acid (EDTA) and nitrilotriacetic acid (NTA), enzymes and bacteriostats. Other optional components include colorants, dyes, perfumes, softeners, clays, some of which may be encapsulated. Materials suitable for the detergent component are well known to the person skilled in the art and are described in many text books as well as other publications.

Foam control agents made according to the method of the invention are useful in any powdered surfactant composition where foam levels need to be controlled, e.g. in laundry detergents and in dishwasher detergents.

There now follows a number of examples to illustrate the invention in which all parts and percentages are given by weight unless otherwise indicated.

Preparation of Foam Control Agents

Examples 1–10

Foam control agents FCA1 to FCA10 were prepared by mixing 66.66 parts of Wessalith® P, a zeolite A manufactured by Degussa, with a mixture of y parts of a silicone antifoam (A), (B) or (C) and z parts of an organic surfactant (I) to (VIII). The mixture was prepared by pure mechanically mixing the antifoam and organic surfactant together and pouring the mixture very slowly into a drum mixer in which the zeolite was placed. The mixture was stirred continuously till a particulate material was obtained. The particulate material was subsequently passed over an Aeromatic® spray granulator for 20 minutes and 80° C.

The silicone antifoam A comprised a branched polydimethyl siloxane polymer and 5% hydrophobic silica, and was prepared according to the teaching of EP 217501.

Silicone antifoam B comprised a linear polydimethylsiloxane having a viscosity at 25° C. of 1000 mm$^2$/s and 2.24% of a hydrophobic silica, treated with a trimethylsilyl end-blocked silicone resin. Silicone antifoam C comprised a trimethylsiloxane end-blocked polymethyloctadecyl siloxane having a chainlength of about 60 silicon atoms, and 12% of a mixture of a hydrophobic silica and a hydrophobic siloxane resin. The organic surfactant I was linear alkyl ethoxylate, supplied by Shell Chemicals under the name Dobanol® 91-8 with only 2% water present; II was a secondary alkyl sulphonate, supplied by Hoechst under the name Hostopur® SAS30 as a 30% dispersion in water; III was sodium dodecyl sulphate, supplied as a 70% dispersion in water; IV was an alkylpolyglucoside with a degree of polymerisation of from 1.1 to 3 and a C$_{8-18}$ hydrocarbon tail, supplied as a 50% dispersion in water by Henkel, under the name Glucopon® 600CSUP; V was a di-fatty acyloxyethyl ammonium methosulphate sold as a 70% dispersion in water under the name HOE S4039; VI was a di-tallow methylhydroxypropylchloride, supplied as a 75% dispersion in water under the name Praepagen® WKL; VII was a betaine based on tallow bis(hydroxyethyl)betaine, supplied as a 40% active dispersion in water under the name Caflon® DB806. VIII was an alkyl amidodimethyl amine betaine, supplied as a 30% dispersion in water under the name Empigen® BS/F and IX was sodium dodecyl sulphenate supplied as a 35% solution in water. In addition to the ingredients, water was added to make the total number of parts used up to 100. This water was evaporated as indicated in the process above.

Details of the foam control agents are given below in Table I.

TABLE I

| FCA no. | Antifoam | | Organic surfactant | |
|---|---|---|---|---|
| | type | y | type | z |
| 1 | A | 10.32 | I | 2.58 |
| 2 | C | 10.42 | III | 2.08 |
| 3 | B | 13.04 | IV | 3.48 |
| 4 | C | 9.42 | V | 5.80 |
| 5 | B | 9.25 | VI | 2.08 |
| 6 | A | 10.67 | VII | 1.33 |
| 7 | A | 10.67 | VIII | 1.33 |
| 8 | B | 9.62 | II + IV | 3.21 + 1.28 |
| 9 | A | 11.54 | I + II | 1.28 + 3.21 |
| 10 | A | 4.76 | VI | 23.81 |

Examples 11–22

Foam control agents FCA11 to FCA22 were prepared according to the method of Examples 1–9 except that no additional water was added and that in addition x parts of a binder 1–6 were used, which were mixed in with the other ingredients prior to depositing the mixture onto the zeolite. Binder 1 was a polycarboxylate copolymer (maleic/acrylic acid) supplied as a 40% aqueous solution under the name Sokolan® CP5; 2 was hydroxypropylcellulose prepared as a 20% aqueous solution, and supplied under the name Klucel®; 3 was a polyvinylpyrrolidone prepared as a 50% aqueous dispersion; 4 was carboxymethylcellulose, prepared as a 10% aqueous dispersion; 5 was a polyethylene glycol supplied as a 40% aqueous solution and 6 was a polycarboxylate polymer (acrylic acid), supplied as a 40% aqueous dispersion under the name Sokolan® PA40. Details of the foam control agents are given below in Table II.

TABLE II

| FCA no. | Antifoam | | Organic surfactant | | Binder | |
|---|---|---|---|---|---|---|
| | type | y | type | z | type | x |
| 11 | B | 10.00 | II | 3.33 | 2 | 20.00 |
| 12 | B | 10.42 | III | 3.17 | 4 | 19.22 |
| 13 | B | 10.42 | IV | 2.08 | 5 | 20.83 |
| 14 | C | 10.40 | IV | 2.50 | 2 | 20.44 |
| 15 | C | 9.40 | V | 3.52 | 1 | 20.42 |
| 16 | B | 9.25 | VI | 2.08 | 1 | 22.00 |
| 17 | A | 10.67 | VII | 1.33 | 6 | 21.33 |
| 18 | A | 10.67 | VIII | 1.33 | 6 | 21.33 |
| 19 | B | 9.62 | II + IV | 3.21 + 1.28 | 3 | 19.22 |
| 20 | B | 10.32 | II + IV | 3.42 + 1.38 | 4 | 18.22 |
| 21 | A | 9.62 | I + II | 1.28 + 3.21 | 1 | 19.22 |
| 22 | A | 9.80 | II | 3.92 | 1 | 19.61 |

Example 23

Foam control agent FAC23 was prepared according to the method of Examples 1–9 except that 74.50 parts of zeolite A was used in the mixture and that in addition 2.9 parts of a Binder 7 was used which is a solution of 12% sodium silicate supplied under the name SK6 by HOECHST in deionized water. Binder 7 was sprayed on the granules after the step of passing over the spray granulator for 20 minutes at 80° C. at the same time as passing the foam control agents at 60° C. for a further period of 10 minutes in the spray granulator described above.

Details of the foam control agent is given in Table III.

TABLE III

| FCA no. | Antifoam | | Organic Surfactant | | Binder | |
|---|---|---|---|---|---|---|
| | type | y | type | z | type | x |
| 23 | A | 12.42 | IX | 9.90 | 7 | 2.9 |

Comparative Examples 1–7

Comparative Foam control agents CFCA1 to CFCA7 were prepared according to Example 10 except that no organic surfactant was used. Details are given in Table IV.

TABLE IV

| CFCA no. | Antifoam | | Binder | |
|---|---|---|---|---|
| | type | y | type | x |
| 1 | A | 11.11 | 1 | 22.22 |
| 2 | A | 11.11 | 2 | 22.22 |
| 3 | C | 11.11 | 3 | 22.22 |
| 4 | B | 11.11 | 4 | 22.22 |
| 5 | C | 11.11 | 5 | 22.22 |
| 6 | A | 11.11 | 6 | 22.22 |
| 7 | B | 16.50 | — | 00.00 |

Preparation of the Powder Detergent Composition

A powder detergent composition was prepared by mixing together 30 parts of zeolite Wessalith®CD, 20 parts of sodium carbonate, 7.5 parts of sodium sulphate, 12.5 parts of dodecyl benzene sulphonate, 10 parts of a non-ionic surfactant made by the condensation of a $C_{14-15}$ alcohol with 7 moles of ethylene oxide and 20 parts of sodium perborate monohydrate. To 100 g lots (Lots 1 to 23) of the detergent composition were added sufficient of the foam control agent of Examples 1 to 23 to give 0.08 g of antifoam where silicone antifoam A was used, 0.2 g of antifoam where silicone antifoam B was used and 0.1 g of antifoam where silicone antifoam C was used. Seven comparative lots (C-Lots 1 to 7) were prepared with the foam control agents of comparative examples 1 to 7, to give the same amount of silicone antifoam as for the Lots described above.

Testing of the Release in the Washing Cycle

A conventional automatic front-loading washing machine, having a transparent loading door, was loaded with 3.5 kg of clean cotton fabric. A wash cycle with a main wash (90° C.) was carried out with each of the Lots prepared above.

The door of the washing machine was indicated with height measures at 25, 50, 75 and 100% of its height respectively indicated below as 1, 2, 3 or 4, 0 indicating there is no foam present. The foam height during the wash cycle was recorded when the rotation drum of the washing machine was stationary. Internal sensors indicated if the whole machine was full (F) or if the foam level was thus that the liquor overflowed from the top of the machine (T). Higher values indicate a higher foam level in the machine and thus worse performance of the foam control agent.

Table V shows the foam levels for each of the Lots and C-Lots for the first 20 minutes of the washing cycle. Lower levels in this part indicate better release of the antifoam in the washing liquor.

TABLE V

| Foam height at | 0 | 5 | 10 | 15 | 20 | minutes |
|---|---|---|---|---|---|---|
| Lot 1 | 0 | 2 | F | 1 | 1 | |
| Lot 2 | 0 | 2 | 2 | 3 | 4 | |
| Lot 3 | 0 | 1 | 2 | 2 | 3 | |
| Lot 4 | 0 | 2 | 2 | 2 | 2 | |
| Lot 5 | 0 | 1 | 2 | 3 | 3 | |
| Lot 6 | 0 | 2 | 2 | 3 | 2 | |
| Lot 7 | 0 | 2 | 2 | 2 | 3 | |
| Lot 8 | 0 | 2 | 2 | 2 | 3 | |
| Lot 9 | 0 | 2 | 1 | 1 | 2 | |
| Lot 10 | 0 | 2 | 2 | 2 | 2 | |
| Lot 11 | 0 | 1 | 2 | 2 | 2 | |
| Lot 12 | 0 | 1 | 2 | 2 | 2 | |
| Lot 13 | 0 | 2 | 2 | 2 | 2 | |
| Lot 14 | 0 | 1 | 2 | 2 | 2 | |
| Lot 15 | 0 | 2 | 2 | 2 | 2 | |
| Lot 16 | 0 | 2 | 2 | 2 | 2 | |
| Lot 17 | 0 | 2 | 2 | 2 | 2 | |
| Lot 18 | 0 | 2 | 2 | 2 | 2 | |
| Lot 19 | 0 | 2 | 1 | 2 | 2 | |
| Lot 20 | 0 | 2 | 2 | 2 | 2 | |
| Lot 21 | 0 | 2 | 1 | 2 | 2 | |
| Lot 22 | 0 | 0 | 1 | 1 | 2 | |
| Lot 23 | 0 | 1 | 1 | 1 | 1 | |
| C-Lot 1 | 0 | 3 | T | T | T | |
| C-Lot 2 | 0 | 2 | T | T | T | |
| C-Lot 3 | 0 | 2 | 4 | 4 | 3 | |
| C-Lot 4 | 0 | 1 | 3 | T | T | |
| C-Lot 5 | 0 | 1 | T | T | 2 | |
| C-Lot 6 | 0 | 3 | T | T | T | |
| C-Lot 7 | 0 | 4 | T | T | T | |

It is clear from the results that there is a great improvement in the release of the antifoam during the initial stages of the wash cycle when the foam control agent is used according to the process of the invention.

A detergent composition identical to Lots 1–23 and to C-Lots 1–7 were also stored at 40° C. for 4 weeks prior to testing, except for Lot 10 which was only stored for 2 weeks. It is clear from the foregoing and subsequent data that storage stability of the foam control agent is improved by either increasing the amount of organic surfactant or by using a binder in conjunction with an organic surfactant. Test results are given in Table VI.

TABLE VI

| Foam height at | 0 | 5 | 10 | 20 | 30 | 40 | 50 | minutes |
|---|---|---|---|---|---|---|---|---|
| Lot 1 | 0 | 3 | T | T | T | T | T | |
| Lot 2 | 0 | 2 | T | T | 4 | 4 | 4 | |
| Lot 3 | 0 | 3 | 4 | T | T | T | 3 | |
| Lot 4 | 0 | 1 | 3 | T | T | 3 | 3 | |
| Lot 5 | 0 | 3 | T | F | T | T | T | |
| Lot 6 | 0 | 3 | T | T | 3 | T | T | |
| Lot 7 | 0 | 3 | T | T | T | F | T | |
| Lot 8 | 0 | 3 | T | T | T | F | T | |
| Lot 9 | 0 | 3 | T | T | T | T | 4 | |
| Lot 10 | 0 | 2 | 2 | 2 | 3 | 3 | 3 | |
| Lot 11 | 0 | 2 | 2 | 2 | 2 | 2 | 2 | |
| Lot 12 | 0 | 1 | 3 | 2 | 2 | 2 | 2 | |
| Lot 13 | 0 | 2 | 2 | 2 | 3 | 3 | F | |
| Lot 14 | 0 | 2 | 3 | 2 | 2 | 2 | 2 | |
| Lot 15 | 0 | 2 | 3 | 2 | 3 | 3 | 4 | |
| Lot 16 | 0 | 2 | 2 | 2 | 3 | 3 | 4 | |
| Lot 17 | 0 | 2 | 2 | 2 | 2 | 2 | 2 | |
| Lot 18 | 0 | 2 | 2 | 2 | 2 | 2 | 3 | |
| Lot 19 | 0 | 1 | 2 | 2 | 3 | 3 | 3 | |
| Lot 20 | 0 | 2 | 2 | 2 | 2 | 3 | 3 | |
| Lot 21 | 0 | 2 | 2 | 2 | 2 | 3 | 3 | |
| Lot 22 | 0 | 1 | 0 | 1 | 2 | 3 | 3 | |
| Lot 23 | 0 | 1 | 1 | 1 | 1 | 3 | 4 | |
| C-Lot 1 | 0 | 2 | 3 | T | F | 3 | 3 | |
| C-Lot 2 | 0 | 3 | T | T | T | T | T | |
| C-Lot 3 | 0 | 2 | T | T | T | 3 | 2 | |
| C-Lot 4 | 0 | 2 | T | T | T | T | T | |
| C-Lot 5 | 0 | 2 | T | T | T | 3 | 4 | |
| C-Lot 6 | 0 | 3 | F | T | T | T | F | |
| C-Lot 7 | 0 | 4 | T | T | T | T | T | |

That which is claimed is:

1. A method of making a particulate foam control agent which consists of from 0.001 to 30 parts by weight of a silicone antifoam consisting of (i) a liquid organopolysiloxane polymer having the formula

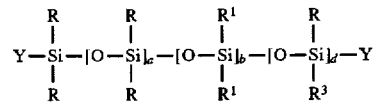

wherein R denotes a monovalent hydrocarbon group having from 1 to 8 carbon atoms, $R^1$ is selected from the group consisting of R groups, hydroxyl groups, and a group having the formula

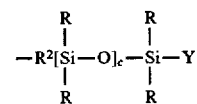

wherein $R^2$ is selected from the group consisting of divalent hydrocarbon groups, divalent hydrocarbonoxy groups, divalent siloxane groups, and oxygen, Y is selected from the group consisting of R groups and hydroxyl groups, $R^3$ is a $C_{9-35}$ alkyl group, a, b, c, and d have a value of 0 or an integer, provided at least one of a and b is an integer and the total of a+b+c+d has a value such that the viscosity of the organopolysiloxane polymer is at least 50 mm²/s at 25° C.; and (ii) a hydrophobic filler particle, from 45 to 99 parts by weight of a zeolite carrier for the antifoam, and optionally 0 to 30 parts by weight of a binder or encapsulant, the foam control agent having the ability to release at least part of the antifoam from the carrier within 10 minutes of the foam control agent being dispersed in an aqueous surfactant solution, said method consisting of depositing onto the zeolite carrier a mixture of the silicone antifoam, from 0.1 to 500% by weight of an organic surfactant which does not contain any silicon atoms, said % by weight being based on the weight of the silicone antifoam, and optionally a binder or encapsulant wherein at least 1 part by weight of the organic surfactant is used per 100 parts by weight of the foam control agent.

2. A method according to claim 1 wherein the organopolysiloxane polymer is a linear polymer, $R^1$ is selected from a group consisting of R groups and hydroxyl groups, Y is a group R and b and d are zero.

3. A method according to claim 1 wherein the organopolysiloxane polymer is a branched siloxane polymer, wherein b has a value of at least 1 and R2 is selected from the group consisting of divalent siloxane groups and oxygen.

4. A method according to claim 1 wherein the organic surfactant and the organopolysiloxane polymer together form an emulsion.

5. A method according to claim 1 wherein the zeolite is a Type A zeolite having an average formula $(Na_2O)_m \cdot Al_2O_3 \cdot (SiO_2)_n \cdot (H_2O)_t$, wherein m has a value of from 0.9 to 1.3, n a value of from 1.3 to 4.0 and t a value of from 1 to 6.

6. A method according to claim 1 wherein the organic surfactant is selected from surfactants which are soluble in an aqueous surfactant solution or surfactants which are dispersible in an aqueous surfactant solution.

7. A method according to claim 1 wherein the organic surfactant is selected from water soluble surfactants or water dispersible surfactants.

8. A method according to claim 1, wherein the organic surfactant is selected from the group consisting of alkyl sulphates, alkyl sulphonates, primary alkyl ethoxylates and alkylpolyglucosides.

9. A method according to claim 1 wherein the organic surfactant is used in an amount of from 2 to 200% by weight of the silicone antifoam.

10. A method according to claim 1 wherein the organic surfactant is used in an amount of from 200 to 500% by weight of the silicone antifoam.

11. A method according to claim 1 wherein the foam control agent comprises from 1 to 25 parts by weight of a binder.

12. A method according to claim 1, wherein the binder is a polycarboxylate material.

13. A method according to claim 12, wherein the polycarboxylate material has at least 60% by weight of segments with the general formula

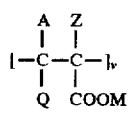

wherein A, Q and Z are each independently selected from the group consisting of hydrogen, methyl, carboxy, carboxymethyl, hydroxy and hydroxymethyl; M is selected from the group consisting of hydrogen, alkali metal, ammonium and substituted ammonium and v is from 30 to 400.

14. A method of making a particulate foam control agent which consists of from 0.001 to 30 parts by weight of a silicone antifoam consisting of (i) a liquid organopolysiloxane polymer having the formula

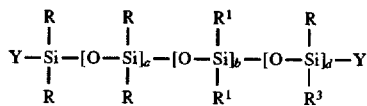

wherein R denotes a monovalent hydrocarbon group having from 1 to 8 carbon atoms, $R^1$ is selected from the group consisting of R groups, hydroxyl groups, and a group having the formula

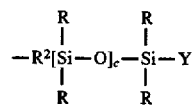

wherein $R^2$ is selected from the group consisting of divalent hydrocarbon groups, divalent hydrocarbonoxy groups, divalent siloxane groups, and oxygen, Y is selected from the group consisting of R groups and hydroxyl groups, $R^3$ is a $C_{9-35}$ alkyl group, a, b, c, and d have a value of 0 or an integer, provided at least one of a and b is an integer and the total of a+b+c+d has a value such that the viscosity of the organopolysiloxane polymer is at least 50 mm²/s at 25° C.; and (ii) a hydrophobic filler particle, from 45 to 99 parts by weight of a zeolite carrier for the antifoam, and optionally 0 to 30 parts by weight of a binder or encapsulant, the foam control agent having the ability to release at least part of the antifoam from the carrier within 10 minutes of the foam control agent being dispersed in an aqueous surfactant solution, said method consisting of A. depositing onto the zeolite carrier an organic surfactant which does not contain any silicon atoms, B. thereafter depositing on the zeolite from 20 to 1000% by weight of the silicone antifoam, said % by weight being based on the weight of the surfactant, and optionally C. depositing a binder or encapsulant on the zeolite after Step A, wherein no more than 100 parts by weight of the foam control agent are used for every part by weight of surfactant.

15. A particulate foam control agent consisting of from 0.001 to 30 parts by weight of a silicone antifoam consisting of (i) a liquid organopolysiloxane polymer having the formula

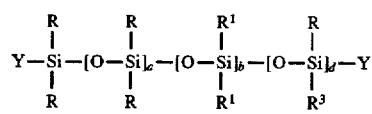

wherein R denotes a monovalent hydrocarbon group having from 1 to 8 carbon atoms, $R^1$ is selected from the group consisting of R groups, hydroxyl groups, and a group having the formula

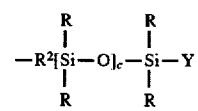

wherein $R^2$ is selected from the group consisting of divalent hydrocarbon groups, divalent hydrocarbonoxy groups, divalent siloxane groups, and oxygen, Y is selected from the group consisting of R groups and hydroxyl groups, $R^3$ is a $C_{9-35}$ alkyl group, a, b, c, and d have a value of 0 or an integer, provided at least one of a and b is an integer and the total of a+b+c+d has a value such that the viscosity of the organopolysiloxane polymer is at least 50 mm²/s at 25° C.; and (ii) a hydrophobic filler particle, from 45 to 99 parts by weight of a zeolite carrier for the antifoam, from 0.1 to 500% by weight of an organic surfactant which does not contain any silicon atoms, said % by weight being based on the weight of the silicone antifoam, which has been deposited onto the zeolite carrier not later than the silicone antifoam, and from 1 to 30 parts by weight of a polycarboxylate binder or a polycarboxylate encapsulant.

16. A particulate foam control agent consisting of (A) from 0.001 to 30 parts by weight of a silicone antifoam which consists of (i) from 70 to 99% by weight of a polyorganosiloxane polymer selected from the group consisting of (a) linear polydiorganosiloxane polymers having a viscosity of more than 12,500 mm²/s at 25° C. and (b) branched polyorganosiloxanes and (ii) from 1 to 30% by weight of a filler material which has its surface made hydrophobic, (B) from 45 to 99 parts by weight of a zeolite carrier for the antifoam, (C) an organic surfactant which does not contain any silicon atoms in an amount which is from 1 to 500% by weight of antifoam (A) which has been deposited onto the zeolite carrier not later than the silicone antifoam, and optionally 0 to 30 parts by weight of a binder or encapsulant.

17. A detergent composition in powder form which consists of 100 parts by weight of a detergent component and a particulate foam control agent consisting of from 0.001 to 30 parts by weight of a silicone antifoam consisting of (i) a liquid organopolysiloxane polymer having the formula

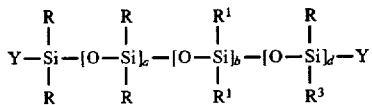

wherein R denotes a monovalent hydrocarbon group having from 1 to 8 carbon atoms, $R^1$ is selected from the group consisting of R groups, hydroxyl groups, and a group having the formula

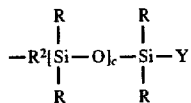

wherein $R^2$ is selected from the group consisting of divalent hydrocarbon groups, divalent hydrocarbonoxy groups, divalent siloxane groups, and oxygen, Y is selected from the group consisting of R groups and hydroxyl groups, $R^3$ is a $C_{9-35}$ alkyl group, a, b, c, and d have a value of 0 or an integer, provided at least one of a and b is an integer and the total of a+b+c+d has a value such that the viscosity of the organopolysiloxane polymer is at least 50 mm²/s at 25° C.; and (ii) a hydrophobic filler particle, from 45 to 99 parts by weight of a zeolite carrier for the antifoam, from 0.1 to 500% by weight of an organic surfactant which does not contain any silicon atoms, said % by weight being based on the weight of the silicone antifoam, which has been deposited onto the zeolite carrier not later than the silicone antifoam, and from 1 to 30 parts by weight of a polycarboxylate binder or a polycarboxylate encapsulant, in sufficient amount to give 0.05 to 5 parts by weight of the silicone antifoam comprised in the foam control agent.

18. A detergent composition in powder form which consists of 100 parts by weight of a detergent component and a particulate foam control agent consisting of (A) from 0.001 to 30 parts by weight of a silicone antifoam which consists of (i) from 70 to 99% by weight of a polyorganosiloxane polymer selected from the group consisting of (a) linear polydiorganosiloxane polymers having a viscosity of more than 12,500 mm²/s at 25° C. and (b) branched polyorganosiloxanes and (ii) from 1 to 30% by weight of a filler material which has its surface made hydrophobic, (B) from 45 to 99 parts by weight of a zeolite carrier for the antifoam, (C) an organic surfactant which does not contain any silicon atoms in an amount which is from 1 to 500% by weight of antifoam (A) which has been deposited onto the zeolite carrier not later than the silicone antifoam, and optionally 0 to 30 parts by weight of a binder or encapsulant in sufficient amount to give 0.05 to 5 parts by weight of the silicone antifoam comprised in the foam control agent.

* * * * *